(12) United States Patent
Gelli et al.

(10) Patent No.: US 9,068,595 B2
(45) Date of Patent: Jun. 30, 2015

(54) CORE WINDER WITH MAGNETIC SUPPORT FOR THE WINDING SPINDLE

(75) Inventors: Mauro Gelli, Lucca (IT); Giancarlo Cicalini, Lucca (IT)

(73) Assignee: Fabio Perini S.p.A., Lucca (IT)

( * ) Notice: Subject to any disclaimer, the term of this patent is extended or adjusted under 35 U.S.C. 154(b) by 821 days.

(21) Appl. No.: 12/452,443

(22) PCT Filed: Oct. 20, 2008

(86) PCT No.: PCT/IT2008/000653
§ 371 (c)(1),
(2), (4) Date: Dec. 30, 2009

(87) PCT Pub. No.: WO2009/054016
PCT Pub. Date: Apr. 30, 2009

(65) Prior Publication Data
US 2010/0113242 A1    May 6, 2010

(30) Foreign Application Priority Data
Oct. 22, 2007   (IT) .................... FI2007A0230

(51) Int. Cl.
| B31C 11/02 | (2006.01) |
| F16C 39/06 | (2006.01) |
| B26D 3/16 | (2006.01) |
| B31C 3/00 | (2006.01) |
| B26D 1/60 | (2006.01) |

(52) U.S. Cl.
CPC .............. *F16C 39/063* (2013.01); *B26D 1/60* (2013.01); *B26D 3/164* (2013.01); *B31C 3/00* (2013.01)

(58) Field of Classification Search
USPC .............. 493/288, 290, 299, 287, 269; 83/54, 83/318, 319, 320
See application file for complete search history.

(56) References Cited

U.S. PATENT DOCUMENTS

| 2,502,638 A | 4/1950 | Becht |
| 2,623,445 A | 12/1952 | Robinson |
| 3,150,575 A | 9/1964 | Couzens et al. |
| 3,220,320 A | 11/1965 | Brigham |
| 3,397,625 A | 8/1968 | Leonardi |
| 3,636,827 A | 1/1972 | Lindberg |
| 3,942,418 A | 3/1976 | Smith |
| 4,003,278 A * | 1/1977 | Shields ........................ 83/186 |
| 4,220,077 A * | 9/1980 | Miller et al. ................... 493/11 |
| 4,299,147 A * | 11/1981 | Rogers .............................. 82/47 |

(Continued)

FOREIGN PATENT DOCUMENTS

| EP | 0 901 797 A2 | 3/1999 |
| GB | 2 115 082 A | 9/1983 |

(Continued)

*Primary Examiner* — Sameh Tawfik
(74) *Attorney, Agent, or Firm* — Breiner & Breiner, L.L.C.

(57) ABSTRACT

The machine includes a forming spindle around which one or more strips of web material are wound; a winding unit to wind the strips of web material around the forming spindle and form therewith a tubular article; and a cutting unit to cut the tubular article into single tubes. The machine also includes at least one magnetic device to support the forming spindle to reduce the flexural deformations thereof.

11 Claims, 2 Drawing Sheets

(56) References Cited

U.S. PATENT DOCUMENTS

| | | |
|---|---|---|
| 4,378,966 A | 4/1983 | Schumacher |
| 4,645,553 A * | 2/1987 | Languillat ............... 156/153 |
| 4,827,816 A * | 5/1989 | Takaniemi ............... 82/70.1 |
| 4,889,023 A | 12/1989 | Languillat |
| 5,111,721 A * | 5/1992 | Languillat ............... 82/47 |
| 5,468,207 A * | 11/1995 | Bower et al. ............... 493/297 |
| 5,593,375 A | 1/1997 | Franci |
| 5,873,806 A | 2/1999 | Biagiotti |

FOREIGN PATENT DOCUMENTS

| WO | WO 2004/101265 A1 | 11/2004 |
|---|---|---|
| WO | WO 2004/106017 A1 | 12/2004 |
| WO | WO 2007/072531 A1 | 6/2007 |

* cited by examiner

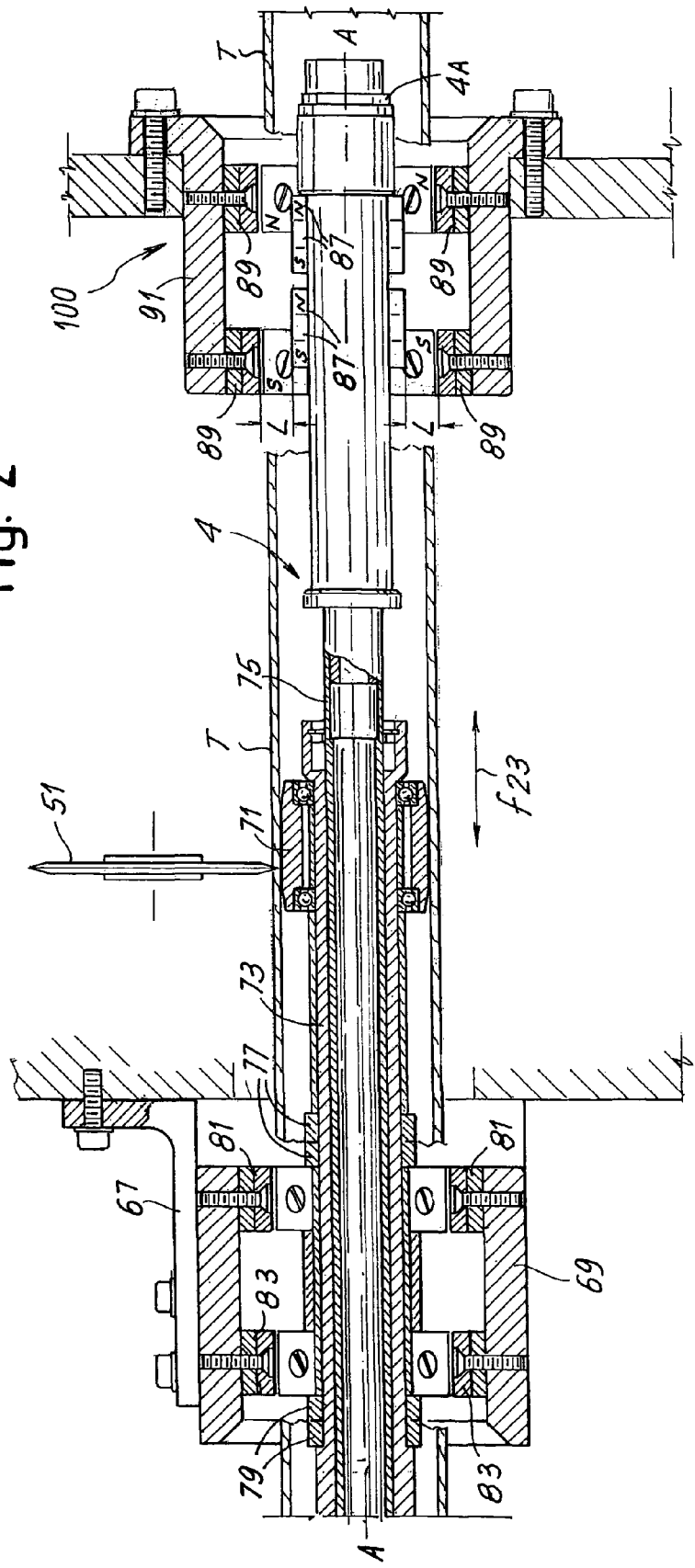

CORE WINDER WITH MAGNETIC SUPPORT FOR THE WINDING SPINDLE

TECHNICAL FIELD

The present invention relates to a core winder, i.e. a machine to produce tubes by winding one or more strips of mutually overlapped and partially staggered web material.

STATE OF THE ART

Machines of this type are commonly used to produce tubes of cardboard or other sheet material for winding web material, such as paper, tissue paper, plastic film, aluminum foil or the like. The tubes thus produced can have various shapes and sections, i.e. circular, square, rectangular or the like. These tubes, besides for winding web materials to form rolls, are also intended for other uses, i.e. as containers for food products, for powder detergents or other applications. Hereunder in the present description reference will be made to the forming of tubes with a circular cross section used as winding cores for web materials, although the scope of the present invention is not limited to this application, but is intended as extended to all fields relating to the formation of tubes from one or more strips of wound web material.

Winding of the web material can be performed by helically winding one or more strips around the forming spindle, as represented and described with reference to the embodiment illustrated below; or it can be obtained by longitudinally feeding two or more strips which overlap reciprocally until their sides mate and winding them around the forming spindle as disclosed, for example, in WO-94/20281.

Therefore, with the term "winding" it is intended that the strips of web material can cover the forming spindle being fed obliquely with respect to the axis of the spindle (helical winding), or parallel to said axis (longitudinal winding).

To produce tubes of cardboard or other material by helically winding one or more staggered and overlapped strips a core winder is used; this typically comprises: a winding spindle, around which the strip or strips are helically wound to continuously form the tube, which is made to advance along the spindle; a device to feed and wind the strips around the spindle; at least one knife to cut single portions of said tube being formed, said knife being provided with an alternating movement parallel to the spindle; a counter-knife inside the tube being formed, provided with a translational movement synchronized with the translational movement of the knife.

A core winder of this type is disclosed, for example, in U.S. Pat. No. 5,873,806. Other machines of this type are described in U.S. Pat. Nos. 2,502,638; 2,623,445; 3,150,575; 3,220,320; 3,636,827; 3,942,418; 4,378,966 as well as in WO-A-2004/101265 and WO-A-2004/106017.

In these machines the tube is formed continuously by winding two or more mutually staggered strips of web material, such as paper or cardboard, around the winding spindle, which is mounted in a cantilever fashion, fixed or rotating (preferably idle). This continuous tube must be cut into single portions for the final use, for example for winding paper to produce rolls. Cutting is performed with one or more disk-shaped cutters which can be motorized, or idle and drawn in rotation through friction with the tube. The cutting edge of the knives can be smooth or serrated depending upon the configuration of the machine. The knives have an axis of rotation parallel to the axis of the spindle and consequently of the tube being formed and are pressed against the outer cylindrical surface of the tube and advance together with said tube parallel to the axis of the forming spindle. During rotation and advance of the tube cutting is performed by the knife or knives according to a cutting plane orthogonal to the axis of the tube being formed. After the complete cut has been performed, the blade is moved away from the axis of the tube and taken back to the position in which the subsequent cut will start.

The counter-knife, with which the knife or knives arranged outside the tube cooperate, is located inside the tube being formed. This counter-knife must follow the movement of the knife or knives during the cut and therefore must advance synchronously with the tube being formed until completion of the cut and then return to the position to which the knife or knives return to start the subsequent cut. In some machines this movement is obtained by positioning the counter-knife on a guide rod forming an extension of the forming spindle and temporarily constraining the counter-knife to the knife as a result of the frictional force generated by pressing the knife against the material to be cut. In this manner, the counter-knife advances together with the knife. When the latter is moved away from the tube the counter-knife is returned to its initial position by a spring.

WO-A-2007/072531 describes a machine for producing a tube of web material, in which the counter-knife is mounted slidingly on the tube forming spindle and is carried in an alternating movement along this spindle, to follow the movement of the knife, through a magnetic system. A series of magnets are constrained to the carriage that carries the knife and cooperate with a series of magnets integral with a sleeve that carries the counter-knife.

In these machines the forming spindle is subject to flexural forces, caused by the winding unit, by the cutting system and by the weight of the spindle, which can lead to flexural deformations of said spindle.

OBJECTS AND SUMMARY OF THE INVENTION

According to one aspect, the purpose of the invention is to improve existing core winders.

The object of one embodiment of the invention is to provide a spindle, which is particularly resistant to flexural stresses.

In one embodiment, the invention provides a machine for producing tubes by winding one or more strips of web material comprising: a forming spindle or winding spindle, around which one or more strips of web material are wound; a winding unit to wind one or more strips of web material around the forming spindle and form a tubular article therewith; a cutting unit to cut the tubular article into single tubes or tube portions. Characteristically, the forming spindle is supported in at least one position by at least one fixed magnetic support device which limits the flexural deformations of this spindle.

The magnetic support allows a constraining force to be applied to the spindle, which reduces the flexural deformation thereof without obstructing continuous advance of the tubular material being formed around the spindle.

According to some embodiments, the magnetic support device is arranged downstream of the cutting unit with respect to the direction of advance of the tubular article. According to other embodiments several magnetic support units are provided, arranged in various positions along the longitudinal extension of the forming spindle. In some embodiments, a magnetic support device is provided between the winding unit and the cutting device or unit.

According to a preferred embodiment of the invention, a magnetic support is arranged at the distal end of the winding spindle, i.e. in a position opposite the support with which the forming spindle is constrained to the fixed structure of the machine.

In some embodiments, the magnetic support device comprises a plurality of first magnets arranged around the axis of the forming spindle and constrained to a fixed load bearing structure extending at least partly around the axis of the spindle and which can be integral with the load bearing structure of the machine. Preferably, the magnets of said plurality of first magnets cooperates with a plurality of second magnets supported by the forming spindle and arranged around the axis thereof, oriented so as to cooperate with the plurality of first magnets for generating magnetic forces that reduce the flexural deformations of the forming spindle. Preferably, the magnets can be permanent magnets. According to some embodiments, the external magnets, carried by the fixed structure surrounding the spindle, can have a plate-shaped development, while the magnets supported by the spindle preferably present an annular structure, with an external diameter approximately equal to or slightly smaller than the diameter of the tube being formed around the spindle. It would also be possible for external magnets, i.e. those carried by the structure surrounding the spindle, to have an annular extension. Preferably, two groups of magnets supported by the spindle and two corresponding groups of magnets constrained to the load bearing structure are provided. In this manner, an arrangement of magnetic forces is obtained which is particularly effective in supporting and stiffening the spindle, reducing the flexural deformations thereof.

According to some embodiments the magnets carried by the forming spindle can be supported on a sleeve or substantially cylindrical element inserted on a central rod of the spindle, with the possibility of rotating around the axis of this spindle to facilitate the advancing movement of the tube being formed around the spindle.

According to some embodiments, the machine comprises a disk-shaped cutting knife cooperating with a counter-knife mounted sliding with alternating motion along the forming spindle. In some embodiments, the advance and return movement of the counter-knife is controlled in a known manner by a magnetic coupling between magnets integral with the counter-knife and magnets integral with a carriage that carries the cutting knife.

Further advantageous features and embodiments of the invention are described hereunder and are indicated in the appended claims, which form an integral part of the present description.

BRIEF DESCRIPTION OF THE DRAWINGS

FIG. 2 shows a longitudinal section of the terminal part of the forming spindle with the knife, the counter-knife and the magnetic support applied to the distal end of the forming spindle.

DETAILED DESCRIPTION OF EMBODIMENTS OF THE INVENTION

Figure 1:
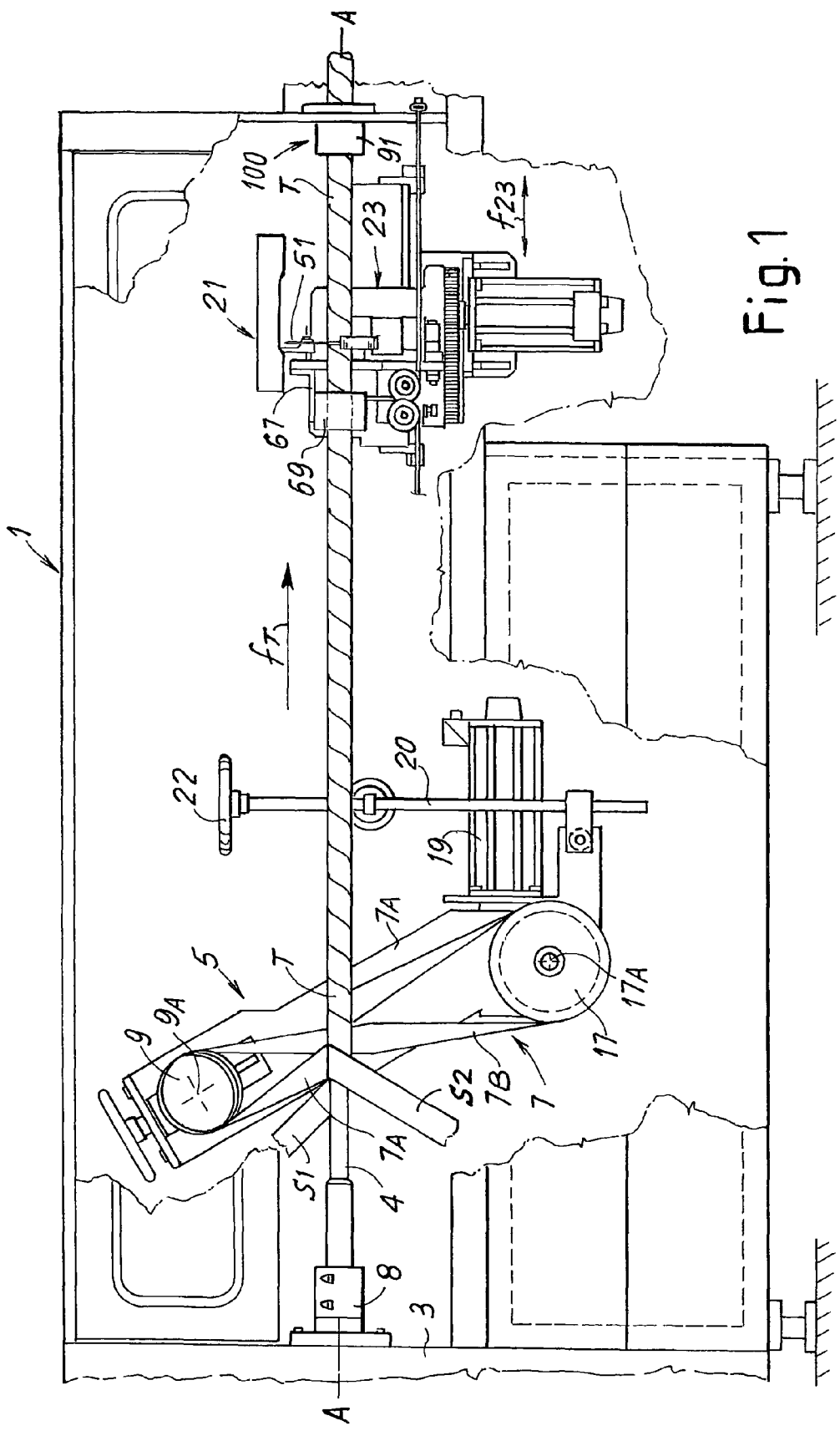
FIG. 1 shows a schematic side view of a core winder, i.e. a machine for forming tubes by winding strips of web material around a forming spindle, in which the present invention is incorporated

FIG. 1 shows as a whole a possible embodiment of a core winder to which the present invention is applied. However, it must be understood that the invention can also be applied to machines with different structures, providing they are equipped with a winding spindle for forming tubes, which can be fixed or rotating (advantageously idly supported) around its axis and which require a cutting device to cut the tube that is formed continuously around the spindle into tubular portions or articles.

Briefly, and limited to the parts of interest for the present description, the machine of FIG. 1, generically indicated with 1, comprises a load bearing structure 3 by which a spindle 4 is supported in a cantilever fashion, with a first end thereof connected to the load bearing structure 3 through a sleeve 8. The opposite end of the spindle 4 terminates in proximity of the area in which the tube is cut. A conveyor or the like (not shown) then removes the single tubular articles obtained by cutting a tube T, formed continuously as described below around the spindle 4.

To form the tube T, one or more strips of cardboard or other continuous web material are fed to the tube forming machine 1. In the example shown, two strips are employed, indicated with S1 and S2. These are fed and wound helically around the spindle 4 with the aid of a feed and winding device 5 comprising, in the example shown, an endless belt 7 which has two branches 7A and 7B, driven around two pulleys 9 and 17, the respective axes of rotation of which are indicated with 9A and 17A. The branch 7A forms a helical turn around the spindle 4 and around the strips of web material S1 and S2 being wound. The number 19 indicates the motor that makes the drive pulley 17 rotate, causing movement of the belt 7.

The inclination of the assembly formed by the pulleys 9, 17, by the belt 7 and by the motor 19 is adjustable using a threaded bar 20 and a handwheel 22, so as to allow adjustment of the inclination of the helical turns formed by the two strips S1, S2 around the axis of the spindle 4.

The two strips S1 and S2 are wound in an overlapped and staggered condition, so that a helix formed by the turns of the outermost strip S1 is made to overlap, staggered for example by half a pitch, a helix formed by the turns of the innermost strip S2. A glue is applied to the inner surface of the outer strip S1 and/or to the outer surface of the inner strip S2, in a manner known and not shown, to make the two turns mutually adhere.

The tube T is produced continuously and must therefore be cut into portions of required length. A cutting device is provided for this purpose, indicated as a whole with 21, located downstream of the winding system 7, 9, 17, 19 with respect to the direction of feed fT of the tube along the winding spindle 4.

The cutting device 21 represented in FIG. 1 can be designed in any known manner, for example it can be of the type described in detail in U.S. Pat. No. 5,873,806, the content of which can be referred to. However, it must be understood that the cutting device used can also be of other type, provided it is equipped with at least one knife, preferably a disk-shaped knife rotating around an axis parallel to the axis of the spindle 4, which in FIG. 1 is indicated with A-A. The specific configuration of the cutting device is not of interest here. It suffices to mention that it is comprised of a carriage 23 equipped with an alternating motion according to the double arrow f23 parallel to the axis A-A of the winding spindle 4. This movement allows the continuous tube T to be cut into single portions without stopping advance of the tube, which is generated continuously as a result of feed of the strips S1, S2 and of rotation of the pulleys 9, 17. As it is known, the cutting knife or knives are pressed radially against the tube T being formed when the carriage 23 is in a cut starting position. The carriage is then made to advance parallel to the spindle 4 by a distance equal to the advance of the tube T being formed during the time required to perform the cut. In practice, the tube T must perform at least one complete rotation around its axis to complete the cut when this is performed with a single knife. This distance can be lower when the cut is performed, for example, with two knives as specifically illustrated in the embodiment described in U.S. Pat. No. 5,873,806, as in this case a rotation of 180° of the tube around its axis is sufficient to completely cut the tube portion.

At least one knife 51, for example a rotating disk-shaped knife, is carried by the carriage 23. This knife cooperates with a counter-knife which, according to some embodiments, can be configured in the shape of a ring carried by a sleeve sliding along the spindle and drawn in translational motion by an assembly of magnets housed inside an annular element 69 constrained through one or more brackets 67 to the carriage 23 equipped with an alternating motion.

FIG. 2 shows in a schematic longitudinal section a possible configuration of the counter-knife indicated with 71, fixed on a sleeve 73 sliding on the inner rod 75 forming the central part of the spindle 4. Pairs of magnets 77, 79 are integral with the sleeve 73, and cooperate with magnets 81, 83 integral with the sleeve or annular element 69. Magnetic interaction between the magnets 77, 79 and 81, 83 causes the sleeve 73 carrying the counter-knife 71 to be drawn in alternating motion according to the double arrow f23 together with the annular element 69 integral with the carriage 23, so that the counter-knife 71 follows the movement of the knife 51. The counter-knife 71 can be idly mounted on the sleeve 73 so as to rotate together with the knife and with the tube being formed around the spindle 4.

Characteristically, according to the invention, in order to reduce the flexural deformations to which the spindle 4 is subjected as a result of the stresses acting thereon (caused by the knife 51 and/or by the winding unit 5 or by its weight), further preferably annular-shaped magnets 87 are arranged in the vicinity of the distal ends 4A of the spindle 4 (i.e. the end opposite the joint 8 supporting the spindle 4 in a cantilever fashion with respect to the fixed structure 3). The polarity of the magnets 87 is indicated in FIG. 2. These magnets 87 cooperate with fixed, for example plate shaped, magnets 89. The polarity of the magnets 89 is also indicated in FIG. 2. The magnets 89 are carried by a structure 91 integral with the load bearing structure 3 and therefore fixed with respect to the machine bed. In some embodiments the structure 91 can have a circular or semi-circular extension, so as to at least partially surround the spindle 4. The support 91 and the magnets 87, 89 form a magnetic support unit indicated as a whole with 100.

The arrangement of the magnets 89, 87 is such that attraction and repulsion forces with radial components, i.e. oriented orthogonally to the axis A-A of the spindle 4, are generated therebetween. These magnetic forces form a constraint comparable to a certain extent to an interlocking constraint that substantially reduces the flexural deformations to which the spindle 4 is subjected as a result of the load applied thereon by the mechanical members interacting with this spindle.

It would also be possible for the group of magnets 87, 89 with the relative support 91 to be arranged in a different position along the axial extension of the spindle, for example in proximity of the winding unit 5. In some embodiments more than one magnetic support group can be provided, instead of a single magnetic support group as indicated in FIG. 2.

The magnets 87 are preferably permanent magnets. Likewise, the magnets 89 are preferably permanent magnets, although it would also be possible to use electromagnets, above all considering that the magnets 89 are carried by a fixed structure and could therefore be supplied with electricity without obstructing advance of the tubular material formed around the spindle 4.

A through opening L of sufficient radial dimension to allow passage of the tubular element being formed continuously around the spindle 4 is left between the magnets 87 and the magnets 89, so that the magnetic support 100 does not interfere with the advancement of the tube being formed.

It is understood that the drawing shows just one example, provided merely as a practical demonstration of the invention, which can vary in its forms and arrangements, without however departing from the scope of the concept underlying the invention. Any reference numbers in the appended claims are provided to facilitate reading of the claims with reference to the description and to the drawing, and do not limit the scope of protection represented by the claims.

The invention claimed is:

1. A machine to produce tubes by winding one or more strips of web material, comprising: a stationary bearing structure; a forming spindle supported at a proximal end by said stationary bearing structure and, around which at least one strip of web material is wound; a winding unit to wind said at least one strip of web material around the forming spindle and form therewith a tubular article, said tubular article advancing in a forward direction along said forming spindle; a cutting unit to cut the tubular article into a plurality of tubes which are removed from the forming spindle at a distal end of the forming spindle, said distal end being opposite said proximal end; and at least one magnetic support device supporting said forming spindle and including a plurality of first magnets which are stationary and which form a first set of magnets, arranged annularly around an axis of the forming spindle, and supported by said stationary bearing structure, and a plurality of second magnets, which form a second set of magnets, carried by the forming spindle and arranged around the axis of the forming spindle and oriented with respect to the first set of magnets so as to generate, with said plurality of first magnets, magnetic forces mutually cooperating to reduce flexural deformations of the forming spindle; wherein said magnetic support device is stationary with respect to the bearing structure and said magnetic support device is stationary with respect to the forming spindle and is located downstream of the cutting unit with respect to said forward direction of the tubular article along said forming spindle, between said cutting unit and said distal end of the forming spindle.

2. The machine as claimed in claim 1, wherein said magnetic support device is arranged in proximity of a free end of said forming spindle.

3. The machine as claimed in claim 1, wherein said plurality of second magnets are permanent magnets.

4. The machine as claimed in claim 1, wherein said plurality of first magnets are permanent magnets.

5. The machine as claimed in claim 1, wherein a through opening for the tubular article is defined between said plurality of first magnets and said plurality of second magnets.

6. The machine as claimed in claim 5, wherein said plurality of first magnets and said plurality of second magnets are substantially annular shaped.

7. The machine as claimed in claim 1, wherein said bearing structure supporting said plurality of first magnets is fixed with respect to a frame of the machine.

8. The machine as claimed in claim 7, wherein said plurality of first magnets and said plurality of second magnets are substantially annular shaped.

9. The machine as claimed in claim 1, wherein said plurality of second magnets are mounted on the forming spindle so as to rotate around the axis of the forming spindle.

10. The machine as claimed in claim 1, wherein said cutting unit includes at least one blade and the machine further includes a contrast member or a counter-blade which cooperates with the at least one blade of the cutting unit and slides along said forming spindle.

11. The machine as claimed in claim 10, wherein said contrast member or said counter-blade is movable to a position substantially corresponding with said magnetic support device.

\* \* \* \* \*